Figure 1:
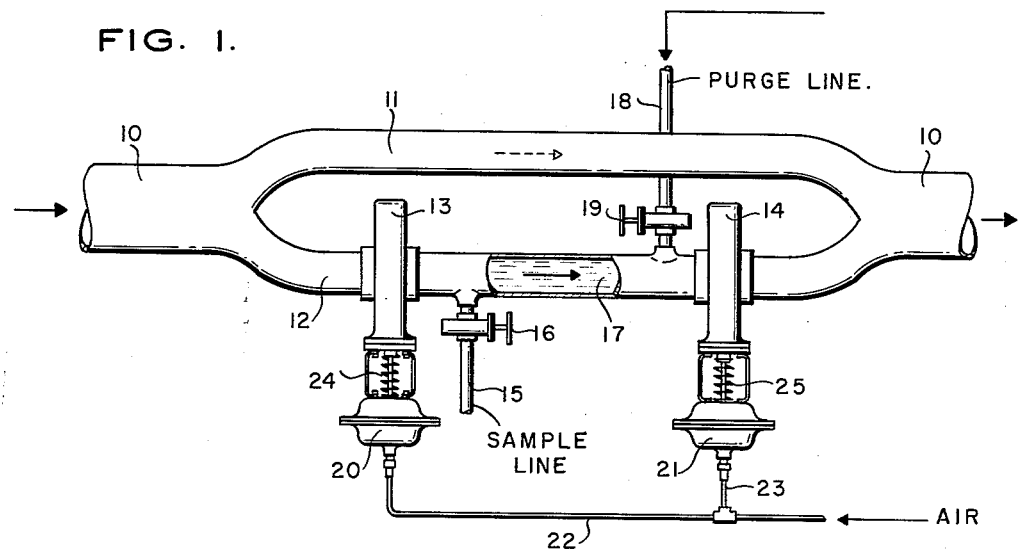

April 2, 1963 N. A. NELSON ETAL 3,083,577
FLUID SAMPLER
Filed April 13, 1959

INVENTORS.
NORMAN A. NELSON,
JOE K. MOORE,
BY

ATTORNEY.

3,083,577
FLUID SAMPLER
Norman A. Nelson, South Houston, and Joe K. Moore, Kingsville, Tex., assignors, by mesne assignments, to Jersey Production Research Company, Tulsa, Okla., a corporation of Delaware
Filed Apr. 13, 1959, Ser. No. 806,157
2 Claims. (Cl. 73—422)

This invention is directed to flowing fluid sampling and especially it is directed to a device for taking samples of fluid flowing in a conduit.

Investigation has shown that to be successful in sampling flowing fluids the flow must be turbulent; the direction and velocity of the fluid flow from the flowstream into the sample tube must not be changed; there must be no "dead" area between the point of sampling and the sample valve; the effect of capillarity must be negligible; the frequency must approach the continuous; and a volume of the sample must be processed which approaches the whole flowstream. These conditions would be satisfied by processing the whole flowstream continuously; however, this would defeat the purpose of sampling. This invention provides a device which approaches this ultimate yet yields a practical volume of sample.

To satisfy all of the conditions for successful sampling, except the one of processing a volume of sample which approaches the whole flowstream, a split stream type sampler is employed which causes the initial flowstream to be split into two or more symmetrical passageways. The flow must be turbulent upstream from the split stream passageways so that fluid characteristics flowing through each passageway will be similar. To satisfy the condition for processing the sample which approaches the whole flowstream, a tandem valve arrangement is employed in one of the passageways so that a section of fluid in the passageway may be isolated between the valves. The isolated section may be purged by gas into a fluid sample container.

Thus an object of this invention is to provide a device for taking fluid samples flowing in a conduit which approaches processing of the whole flowstream continuously.

Figure 2:
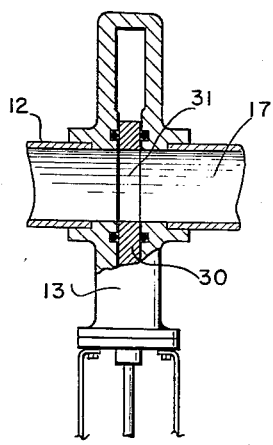

This object and other objects of the invention will be apparent from a description of the invention taken in conjunction with the drawing wherein:

FIG. 1 is a partly sectional view of the sampler device connected to a flow conduit; and FIG. 2 is a partly sectional view of one of the tandem valves.

For a more complete understanding of the invention, reference to the drawings in greater detail will now be made.

In FIG. 1 is shown a pipe or flow conduit 10 divided into a plurality of flow passageways or conduits 11 and 12. The cross-sectional areas of conduits 11 and 12 and pipe 10 are not critical except to the extent that turbulent flow is maintained in the conduits. Two spaced-apart valves 13 and 14 are positioned on conduit 12 and function when closed to trap or isolate a sample of fluid in a chamber 17 formed between the valves. A sample line 15 provided with a drain valve 16 and a gas purge line 18 provided with a valve 19 are connected to conduit 12 and fluidly communicate with chamber 17.

Valves 13 and 14 may be automatically and simultaneously operated and for these purposes a pneumatic system of operation is illustrated. Valves 13 and 14 may be conventional spring-biased diaphragm type valves. In the operation thereof air or other gas is supplied to conduits 22 and 23 from a suitable source to move diaphragms 20 and 21 and the valve elements connected thereto against the bias of springs 24 and 25, respectively, to close valves 13 and 14. Release of air pressure in conduits 22 and 23 permits valves 13 and 14 to open under the action of springs 24 and 25, respectively. A more detailed view of valve 13 is shown in FIG. 2 where it is seen that valve element 30 of valve 13, when in its fully open position, has an opening 31 the same size as the opening of conduit 12.

In operation, when it is desired to take a fluid sample of the turbulent fluid flow stream passing through conduits 11 and 12, air pressure is applied to diaphragms 20 and 21 through conduits 22 and 23, respectively, to close valves 13 and 14 and thereby isolate a sample of fluid in chamber 17. Then valve 16 is opened to drain the isolated sample of fluid from chamber 17. If desired, valve 19 may be opened to purge chamber 17 of the entrapped fluid sample. Although not shown, purge valve 19 and discharge valve 16 may be pneumatically operated and arranged to open after closure of valves 13 and 14 and to close before opening of these valves.

Having fully described the nature, objects, and operation of our invention, we claim:

1. Apparatus for sampling fluids moving in a conduit in turbulent flow comprising a conduit split into at least two symmetrical, longitudinally extending passageways along a portion of the length thereof, the arrangement of said passageways being such that the direction of fluid flow in said conduit upstream of said passageways and in said passageways is substantially unchanged and the cross-sectional areas of each of said pasageways relative to the cross-sectional area of said conduit upstream of said passageways being such that the velocity of fluid flow in each of said passageways is at least as great as the velocity of the turbulent flow in said conduit upstream of said passageways; valve means arranged in one of said passageways adapted to isolate a section of fluids flowing through said one passageway; and means for discharging all of said isolated section of fluids.

2. Apparatus as recited in claim 1 including means for purging said isolated section of fluids.

References Cited in the file of this patent
UNITED STATES PATENTS

| 1,254,871 | Wilson | Jan. 29, 1918 |
| 1,562,121 | Newton | Nov. 17, 1925 |
| 1,837,858 | Grace | Dec. 22, 1931 |
| 2,698,120 | Fairchild | Dec. 28, 1954 |
| 2,784,594 | Struck | Mar. 12, 1957 |